(12) United States Patent
Swaine et al.

(10) Patent No.: US 7,003,699 B2
(45) Date of Patent: Feb. 21, 2006

(54) GENERATION OF TRACE SIGNALS WITHIN A DATA PROCESSING APPARATUS

(75) Inventors: Andrew B Swaine, Welwyn Garden City (GB); David J Williamson, Austin, TX (US)

(73) Assignee: ARM Limited, Cambridge (GB)

( * ) Notice: Subject to any disclaimer, the term of this patent is extended or adjusted under 35 U.S.C. 154(b) by 637 days.

(21) Appl. No.: 10/206,829

(22) Filed: Jul. 29, 2002

(65) Prior Publication Data
US 2003/0229823 A1   Dec. 11, 2003

(30) Foreign Application Priority Data
Jun. 7, 2002   (GB)   .................................. 0213149

(51) Int. Cl.
*G06F 11/00* (2006.01)
(52) U.S. Cl. ........................................................ 714/30
(58) Field of Classification Search .................. 714/30, 714/33, 37
See application file for complete search history.

(56) References Cited

U.S. PATENT DOCUMENTS

| 5,724,505 A | 3/1998 | Argade et al. |
| 5,764,885 A | 6/1998 | Sites et al. |
| 6,148,381 A * | 11/2000 | Jotwani ....................... 711/158 |
| 6,615,370 B1 | 9/2003 | Edwards et al. |

FOREIGN PATENT DOCUMENTS

| JP | 62224841 A * | 10/1987 |
| JP | 2001-147835 | 5/2001 |

OTHER PUBLICATIONS

ARM Limited, "Trace Debug Tools" Version 1.2 User Guide, May 2002.

* cited by examiner

*Primary Examiner*—Bryce P. Bonzo
(74) *Attorney, Agent, or Firm*—Nixon & Vanderhye P.C.

(57) ABSTRACT

The present invention provides a data processing apparatus and method for generating trace signals. The data processing apparatus comprises a component whose behaviour is to be traced, and a trace generation unit for receiving input signals from the component indicative of the behaviour, and for generating from the input signals high priority and low priority trace signals for outputting to a trace receiving device. The trace generation unit is responsive to assertion of a suppression signal from the trace receiving device to suppress generation of the low priority trace signals, with the aim of avoiding overflow of the trace receiving device. Furthermore, in the event that multiple trace modules are provided within a data processing apparatus, embodiments of the present invention provide funnel logic to enable the trace signals generated by those various trace modules to be combined into a single trace stream having a bandwidth which is less than the collective maximum bandwidth of the individual trace streams generated by the multiple trace modules.

91 Claims, 6 Drawing Sheets

GENERATION OF TRACE SIGNALS WITHIN A DATA PROCESSING APPARATUS

BACKGROUND OF THE INVENTION

1. Field of the Invention

The present invention relates to the generation of trace signals within a data processing apparatus having one or more components whose behaviour is to be traced.

2. Description of the Prior Art

Tracing the activity of a data processing system whereby a trace stream is generated including data representing the step-by-step activity within the system is a highly useful tool in system development. However, with the general move towards more deeply embedded processor cores, it becomes more difficult to track the state of the processor core via externally accessible pins. Accordingly, as well as off-chip tracing mechanisms for capturing and analysing trace data, increased amounts of tracing functionality are being placed on-chip. An example of such on-chip tracing mechanisms is the Embedded Trace Macrocell (ETM) provided by ARM Limited, Cambridge, England, in association with various of their ARM processors.

Such tracing mechanisms produce in real time a trace stream of data representing activities of the data processing system that are desired to be traced. This trace stream can then subsequently be used to facilitate debugging of sequences of processing instructions being executed by the data processing system.

It is known to provide tracing mechanisms incorporating trigger points that serve to control the tracing operation, such as starting or stopping tracing upon access to a particular register, address or data value. Such mechanisms are very useful for diagnosing specific parts of a system or types of behaviour.

However, as data processing systems increase in complexity, it is clear that there is potentially a very large amount of information that could be traced. Typically the stream of trace data that is generated by the ETM is buffered prior to output for subsequent analysis, and accordingly there is the potential for bursts of trace data to cause that buffer to overflow, thereby resulting in loss of trace data. For example, in a typical implementation, all of the trace data generated by the ETM may be written immediately to an internal First-In-First-Out (FIFO) buffer, and then subsequently drained through a relatively narrow bandwidth trace port to a trace buffer. When a broad spectrum of behaviour of the data processing apparatus is being traced, it is possible that bursts of trace data can cause the FIFO to overflow, leading to loss of trace data.

One known technique for seeking to combat this problem is to arrange the ETM to output a signal to the component whose behaviour is being traced when the fullness of the FIFO reaches a predetermined level, this signal then causing the component to stall with the aim of allowing the FIFO to drain before an overflow occurs. However, the use of such a signal has proved difficult to implement in practice, since it requires action to be taken externally to the ETM (i.e. by the component being traced) to seek to avoid overflow of the FIFO. It will be appreciated that there is an inherent latency between the ETM issuing such a signal, and that signal being actioned by the component being traced, for example a processor core, and during that latency period, further activities of that component will continue to be traced, and may cause the FIFO to overflow in any event.

Accordingly, it will be desirable to provide an improved technique for seeking to reduce the likelihood of loss of trace data.

SUMMARY OF THE INVENTION

Viewed from a first aspect, the present invention provides a data processing apparatus, comprising: a component whose behaviour is to be traced; and a trace generation unit for receiving input signals from the component indicative of the behaviour, and for generating from said input signals high priority and low priority trace signals for outputting to a trace receiving device; the trace generation unit being responsive to assertion of a suppression signal from the trace receiving device to suppress generation of the low priority trace signals.

In accordance with the present invention, the trace signals generated by the trace generation unit are classified as being either high priority or low priority trace signals. The trace signals generated by the trace generation unit are output to a trace receiving device, and the trace generation unit is responsive to assertion of a suppression signal from the trace receiving device to suppress generation of the low priority trace signals. The invention stems from the realisation that there will typically be certain trace signals that are more important to trace than other trace signals. For example, there will be certain types of trace signals that may need to be output in order to maintain instruction trace, for example trace signals relating to branch addresses, whilst there will be certain other trace signals that can be lost without losing synchronisation, for example data trace signals. The inventors of the present invention also realised that in many situations the former type of trace signal is of much lower bandwidth than the latter type of trace signal.

With this is mind, the data processing apparatus of the present invention is arranged to cause suppression of the low priority trace signals when deemed necessary by the trace receiving device, this hence alleviating the above described problem of the prior art, whereby the trace receiving device might overflow, leading to an arbitrary loss of trace data. Instead, in accordance with the present invention, if the trace receiving device deems it appropriate, it can issue a suppression signal to the trace generation unit to ensure that only the high priority trace signals are output, thereby significantly reducing the likelihood that the trace receiving device will overflow.

Since this suppression occurs directly between the trace generation unit and the trace receiving device, the above described problems with the prior art resulting from the latency of issuing signals back to the component being traced are significantly alleviated, and accordingly the present invention provides a much more reliable approach to avoiding overflow of the trace receiving device, whilst ensuring that the only trace signals lost are those considered to be low priority trace signals.

It will be appreciated that the trace receiving device can be located locally to the trace generation unit or remotely from the trace generation unit. In preferred embodiments, the trace receiving device is provided within the data processing apparatus, preferably being provided on-chip with the trace generation unit, thereby facilitating rapid propagation of the suppression signal from the trace receiving device to the trace generation unit, and accordingly enabling a quick response by the trace generation unit in the event that low priority trace signals need to be suppressed. This further improves the reliability that the issuance of the suppression signal will enable the low priority trace signals to be suppressed in time to avoid overflow of the trace receiving device.

The trace receiving device may take a variety of forms. However, in preferred embodiments, the trace receiving device is a buffer (e.g. a FIFO buffer) of a predetermined size for storing the trace signals output by the trace generation unit.

In preferred embodiments, the buffer is arranged to assert the suppression signal when the amount of trace signals stored within the buffer reaches a predetermined suppression level. Accordingly, in such embodiments, when a certain percentage of the buffer contains trace signals, the suppression signal will be asserted.

The device used to read and analyse the trace signals generated by the data processing apparatus may be arranged to be coupled directly to the trace receiving device. However, in preferred embodiments, the trace receiving device is an intermediate buffer having an input port coupled to the trace generation unit via a first bus having a first bandwidth, and having an output port coupled to a second bus having a second bandwidth so as to allow the trace signals to be output to a trace buffer, the first bandwidth being larger than the second bandwidth. In such embodiments, the device used to read and analyse the trace signals generated by the data processing apparatus would typically be arranged to read the trace signals out from the trace buffer.

As will be appreciated, in such embodiments, there is the potential for the intermediate buffer to become full, since its output bandwidth is less than its input bandwidth. However, through use of the suppression signal of the present invention, the likelihood of this happening can be significantly reduced due to the ability of the trace generation unit to promptly respond to the suppression signal so as to avoid further generation of low priority trace signals.

As mentioned previously, the present invention requires the trace signals to be classified as either high priority or low priority trace signals. In preferred embodiments, this classification is maintained within the trace generation unit identifying whether any particular trace signal is a high priority trace signal or a low priority trace signal. It will be appreciated by those skilled in the art that the classification could be predetermined, for example to indicate that trace signals relating to instruction trace are high priority, whilst trace signals relating to data trace are low priority. Alternatively, the classification could be programmable.

In preferred embodiments, the trace generation unit is arranged, whilst the suppression signal is asserted, to output to the trace receiving device a placeholder for low priority trace signals suppressed to indicate that suppression has occurred. This then enables the tools subsequently used to analyse the trace data to determine when suppression of low priority trace signals has taken place.

Whilst such placeholders could be issued each time an item of trace data is to be suppressed, in preferred embodiments the trace generation unit is arranged to only output a placeholder for the first low priority trace signal suppressed. Hence, the placeholder would indicate the first occurrence of suppression, this being sufficient to enable the trace analyser tools to determine the presence of data suppression without risking the possibility that the issuance of the placeholders will itself cause the trace receiving device to overflow.

In preferred embodiments, the trace receiving device is arranged to de-assert the suppression signal when the amount of trace signals stored within the buffer reduces to a predetermined restart level. The predetermined restart level may be chosen to be the same as the predetermined suppression level, although it will be appreciated that if the predetermined restart level is chosen in such a way, this would tend in certain situations to cause a certain amount of oscillation between the suppressed and non-suppressed states. Hence, in preferred embodiments, the predetermined suppression level is higher than the predetermined restart level, thus ensuring that when full trace is restarted, there is still some capacity to increase the amount of trace signals stored within the trace receiving device without needing to re-assert the suppression signal.

In preferred embodiments, for the first low priority trace signal following de-assertion of the suppression signal, the trace generation unit is arranged to output that first low priority trace signal with any required synchronisation data required to enable that first low priority trace signal to be subsequently analysed. This hence restores to the stream of trace signals any synchronisation information that is lost as a result of a certain portion of the trace stream being suppressed.

As data processing systems increase in complexity, for example due to the level of integration in embedded systems growing, more functionality is included in each data processing apparatus (for example a chip), and accordingly it is envisaged that there will be a requirement for more trace blocks or modules to be provided within the data processing apparatus. A single trace module, including a single trace generation unit, may no longer be sufficient, since in such future systems there may be multiple components each requiring their behaviour to be traced. For example, a data processing apparatus may include multiple processor cores, each requiring trace, and additionally various buses within the data processing apparatus may need to be traced. However, it is envisaged that the cost of providing external pins, or trace buffers, for each trace module is likely to be too high. However, it may not be appropriate simply to share pins, or a trace buffer, between multiple trace modules, since different parts of the data processing apparatus will interact, and therefore need to be traced at the same time in order to be debugged. Accordingly, another problem to be solved is how to enable the trace signals from multiple trace modules of a data processing apparatus to be effectively traced.

Accordingly, in preferred embodiments of the present invention, the data processing apparatus further comprises: a plurality of trace modules for receiving input signals from one or more components whose behaviours are to be traced, each trace module being arranged to generate from its respective input signals trace signals for outputting over a corresponding trace bus, at least one of said trace modules comprising said trace generation unit and its corresponding trace receiving device, and the corresponding trace bus being coupled to an output of the trace receiving device; and funnel logic coupled to the trace buses of the trace modules so as to receive as input trace signals the trace signals output on each trace bus, and being arranged to generate at an output port a trace stream derived from the input trace signals, the output port having a maximum bandwidth which is less than the collective maximum bandwidth of the trace buses coupled to the funnel logic; the funnel logic being arranged to control the issuance of trace signals by the trace modules to ensure that the input trace signals can be output from the output port without exceeding the maximum bandwidth of the output port.

Hence, in such embodiments, funnel logic is provided which is coupled to the trace buses of the various trace modules, and which is arranged to generate at an output port a trace stream derived from the various input trace signals, this trace stream for example then being routed to pins enabling the signals to be routed off chip, or being passed into a trace buffer. The funnel logic is then arranged to control the issuance of trace signals by the various trace modules to ensure that the input trace signals can be output from the output port without exceeding the maximum bandwidth of the output port. Hence, the funnel logic of preferred embodiments is effectively able to take multiple trace sources as input, and to produce a single trace stream as output, where the output stream is narrower than the sum of potential input streams.

This funnel logic could be provided within a data processing apparatus, irrespective of whether any of the trace modules include the ability to suppress generation of low priority trace signals in accordance with the first aspect of the present invention. Accordingly, viewed from a second aspect, the present invention provides a data processing apparatus, comprising: a plurality of trace modules for receiving input signals from one or more components whose behaviours are to be traced, each trace module being arranged to generate from its respective input signals trace signals for outputting over a corresponding trace bus; and funnel logic coupled to the trace buses of the trace modules so as to receive as input trace signals the trace signals output on each trace bus, and being arranged to generate at an output port a trace stream derived from the input trace signals, the output port having a maximum bandwidth which is less than the collective maximum bandwidth of the trace buses coupled to the funnel logic; the funnel logic being arranged to control the issuance of trace signals by the trace modules to ensure that the input trace signals can be output from the output port without exceeding the maximum bandwidth of the output port.

In preferred embodiments, at any point in time, the funnel logic is arranged to indicate to the trace modules which trace module should provide trace signals to the funnel logic, such that the trace stream only contains the trace signals from one trace module at any point in time.

It will be appreciated that the act of determining which trace module should provide trace signals to the funnel logic at any point in time could be embodied in a variety of ways. However, in preferred embodiments the funnel logic comprises a request handler for receiving request signals from each trace module wishing to output trace signals onto its corresponding trace bus, and for applying predetermined criteria to determine from the received request signals which trace module should provide trace signals to the funnel logic. Hence, in such embodiments, each trace module is arranged to indicate to the funnel logic when it wishes to output trace signals onto its corresponding trace bus, and the funnel logic then arbitrates between the various requests received.

Preferably, the request handler is arranged, upon application of the predetermined criteria, to issue a grant signal to the trace module that is to provide trace signals to the funnel logic. Hence, in such embodiments, it is envisaged that a particular trace module will continue to assert its request signal until it receives a grant signal indicating that it is then able to provide its trace signals to the funnel logic.

It will be appreciated that the predetermined criteria applied by the request handler of the funnel logic in order to determine which trace module should provide trace signals to the funnel logic at any particular point in time could take a variety of forms. However, in preferred embodiments the predetermined criteria defines a prioritisation between the various trace modules.

The predetermined criteria can either be predetermined, or may be programmable. For example the predetermined criteria could be programmable for a particular implementation to identify relative priorities to be assigned to the various trace modules, dependent for example on the components that those modules are arranged to trace the behaviour of. For example, it may be determined that the most important trace signals to be output are those relating to the activities of a memory bus, and accordingly the highest priority could be assigned to the trace module arranged to trace the activities of that memory bus.

In preferred embodiments, the funnel logic further comprises a multiplexer whose inputs are coupled to respective ones of said trace buses, the request handler being arranged, upon application of the predetermined criteria, to issue a control signal to the multiplexer to control which input of the multiplexer is to be output from the multiplexer as the trace stream for routing to the output port of the funnel logic.

To effectively analyse the trace stream output by the funnel logic, it will be necessary for the tools used to perform the analysis to know which component any particular portion of the trace stream relates to. In preferred embodiments, the funnel logic includes the necessary logic to enable such identifiers to be added into the trace stream. More particularly, in preferred embodiments, the funnel logic further comprises wrapping logic for introducing into the trace stream an identifier indicating which component a particular portion of the trace stream relates to. It will be appreciated that the identifier could be derived in a number of ways. However, in one embodiment, the wrapping logic is arranged to receive the control signal issued to the multiplexer, the identifier being derived from the control signal. In an alternative embodiment, each trace module is arranged to issue an identifier which is routed through to the wrapping logic.

It will be appreciated that there are a variety of ways in which components could be mapped to corresponding trace modules. For example, in certain implementations a single trace module may actually be arranged to trace the activities of more than one component. However, in preferred embodiments, one trace module is provided for each component to be traced.

In certain embodiments, each of the trace modules will be arranged to issue request signals to the funnel logic, and accordingly in such situations the funnel logic will be able to control issuance of trace signals by each trace module.

However, in alternative embodiments, one or more of the trace modules may not be arranged to issue such request signals, or may not be responsive to grant signals, for example because that trace module may be a legacy design of trace module which is arranged merely to output its trace stream as and when it determines it appropriate. In such situations, the issuance of trace signals by at least one of the trace modules is not controllable by the funnel logic, and the data processing apparatus further comprises a stalling buffer for each such trace module coupled between that trace module and the funnel logic to buffer trace signals output by that trace module.

In such embodiments, the stalling buffer is preferably arranged to issue a request signal on behalf of the associated trace module and to respond to any grant signal issued by the request handler to cause the buffered trace signals to be output to the funnel logic. Hence, in effect, the stalling buffer becomes a "front-end" for such a legacy trace module, to enable it to interface in the appropriate manner with the funnel logic.

In preferred embodiments, the stalling buffer is arranged to issue the request signal when the amount of trace signals stored within the stalling buffer reaches a predetermined level. By appropriate choice of the predetermined criteria applied by the funnel logic to determine which trace module should provide trace signals to the funnel logic at any particular point in time, and by restricting the number and bandwidth of the elements interfacing with the funnel logic, it can be ensured that a stalling buffer will receive a grant signal before it overflows with trace data output by the associated trace module.

As mentioned previously, the output port of the funnel logic may be coupled to a trace buffer of the data processing apparatus. Alternatively the output port may comprise a plurality of pins for enabling the trace stream to be output from the data processing apparatus.

Viewed from a third aspect, the present invention provides a method of generating trace signals within a data processing apparatus having a component whose behaviour is to be traced, the method comprising using a trace generation unit to perform the steps of: (i) receiving input signals from the component indicative of the behaviour; (ii) generating from said input signals high priority and low priority trace signals for outputting to a trace receiving device; and (iii) during said step (ii), being responsive to assertion of a suppression signal from the trace receiving device to suppress generation of the low priority trace signals.

Viewed from a fourth aspect, the present invention provides a method of generating trace signals within a data processing apparatus having a plurality of trace modules for receiving input signals from one or more components whose behaviours are to be traced, each trace module being arranged to generate from its respective input signals trace signals for outputting over a corresponding trace bus, the method comprising the steps of: (a) receiving at funnel logic as input trace signals the trace signals output on each trace bus; (b) generating at an output port of the funnel logic a trace stream derived from the input trace signals, the output port having a maximum bandwidth which is less than the collective maximum bandwidth of the trace buses coupled to the funnel logic; and (c) controlling the issuance of trace signals by the trace modules to ensure that the input trace signals can be output from the output port without exceeding the maximum bandwidth of the output port.

Viewed from a fifth aspect, the present invention provides a computer program product carrying a computer program for controlling an apparatus in accordance with a method of either the third or the fourth aspects of the present invention.

BRIEF DESCRIPTION OF THE DRAWINGS

The present invention will be described, further by way of example only, with reference to preferred embodiments thereof as illustrated in the accompanying drawings, in which.

DESCRIPTION OF A PREFERRED EMBODIMENT

Figure 1:
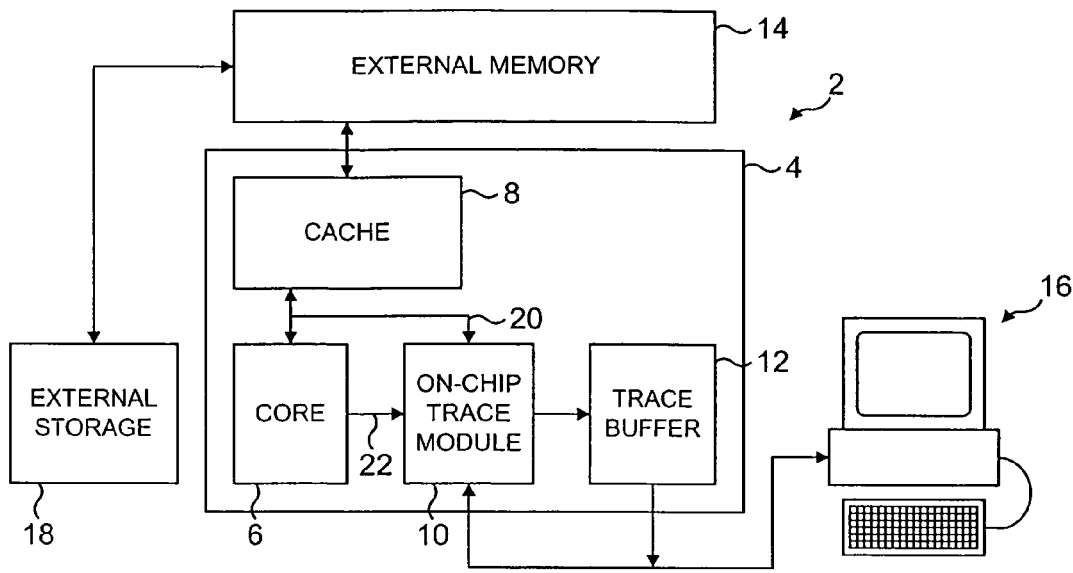
FIG. 1 schematically illustrates a data processing system providing on-chip tracing mechanisms.

FIG. 1 schematically illustrates a data processing system 2 providing an on-chip tracing mechanism. An integrated circuit 4 includes a microprocessor core 6, a cache memory 8, an on-chip trace module 10 and an on-chip trace buffer 12. The integrated circuit 4 is connected to an external memory 14 which is accessed when a cache miss occurs within the cache memory 8. A general purpose computer 16 is coupled to the on-chip trace module 10 and the on-chip trace buffer 12 and serves to recover and analyse a stream of tracing data from these elements using software executing upon the general purpose computer 16.

It is often the case that the processor core 6 may, during operation, need to access more data processing instructions and data than there is actually space for in the external memory 14. For example, the external memory 14 may have a size of 1 MB, whereas the processor core 6 might typically be able to specify 32-bit addresses, thereby enabling 4 GB of instructions and data to be specified. Accordingly, all of the instructions and data required by the processor core 6 are stored within external storage 18, for example a hard disk, and then when the processor core 6 is to operate in a particular state of operation, the relevant instructions and data for that state of operation are loaded into the external memory 14.

Figure 2:
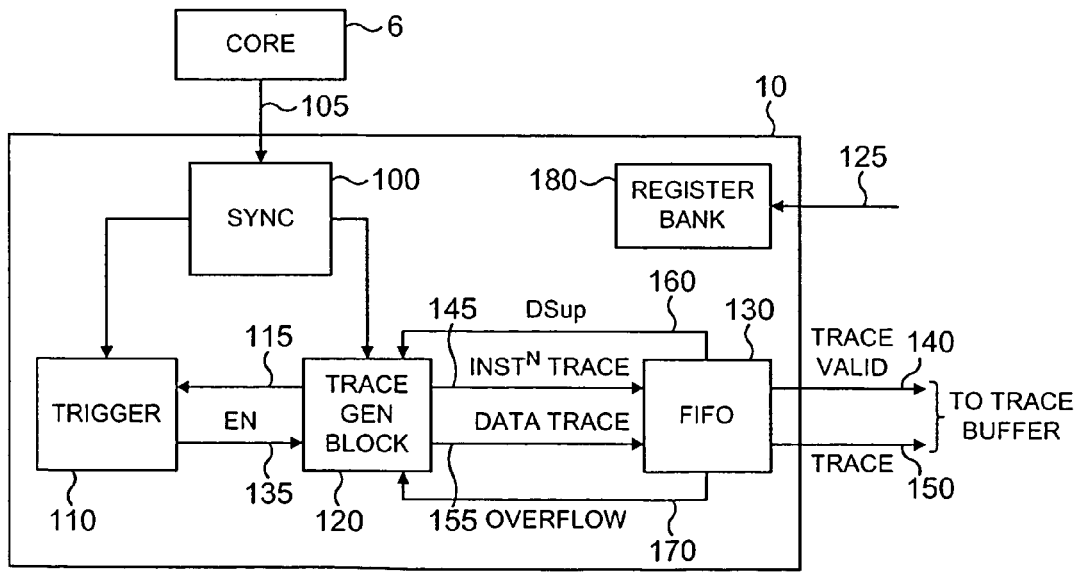
FIG. 2 is a block diagram illustrating in more detail the elements provided within the on-chip trace module of FIG. 1 in accordance with preferred embodiments of the present invention.

FIG. 2 is a block diagram illustrating in more detail the components provided within the on-chip trace module of FIG. 1. The on-chip trace module 10 is arranged to receive over path 105 data indicative of the processing being performed by the processor core 6. With reference to FIG. 1, this may be received from the bus 20 connecting the core 6, cache 8, and on-chip trace module 10 (such data for example indicating instructions and/or data presented to the core 6, and data generated by the core), along with additional control-type data received directly from the core over bus 22 (for example, an indication that the instruction address is being indexed, an indication that a certain instruction failed its condition codes for some reason, etc). As will be appreciated by those skilled in the art, in certain embodiments both types of data could be passed to the trade module 10 over a single bus between the trace module 10 and the core 6 (rather than using two buses 20, 22).

The sync logic 100 is arranged to convert the incoming signals into internal versions of the signals more appropriate for use within the on-chip trace module. These internal versions are then sent to the trigger 110 and the trace generation block 120, although it will be appreciated that the trigger 110 and the trace generation block 120 will not necessarily need to receive the same signals. Fundamentally, the trigger 110 needs to receive data relating to triggerable events, for example instruction addresses, data values, register accesses, etc. The trace generation block 120 needs to receive any data that would need to be traced dependent on the enable signals issued by the trigger 110. The on-chip trace module 10 further incorporates a register bank 180 which is arranged to receive configuration information over path 125 from the general purpose computer 16, whose contents can be read by the components of the on-chip trace module 10 as required.

Whenever the trigger 110 detects events which should give rise to the generation of a trace stream, it sends an enable signal over path 135 to the trace generation logic 120 to turn the trace on and off. The trace generation logic reacts accordingly by outputting the necessary trace data to the FIFO 130 over paths 145, 155. It will be appreciated that a variety of enable signals may be provided over path 135, to identify the type of signals which should be traced, for example trace only instructions, trace instructions and data, etc.

In accordance with preferred embodiments of the present invention, the trace signals generated by the trace generation unit are classified as being either high priority or low priority trace signals. The classification will preferably be maintained within the trace generation block 120, and may be predefined or user programmable. In the embodiment illustrated in FIG. 2, the high priority trace signals are those concerning instruction trace, for example trace signals relating to branch addresses, whilst the low priority trace signals are those relating to data trace, such low priority trace signals being able to be lost without losing synchronisation. In the absence of any signals being received by the trace generation logic 120 from the FIFO 130, the trace generation logic will be arranged to output appropriate trace data to the FIFO 130 dependent on the enable signals received from the trigger 110 over path 135. This might for example result in both instruction trace signals being issued over path 145 and data trace signals being issued over path 155. It will be appreciated by those skilled in the art that although two distinct paths have been illustrated in FIG. 2, both the instruction trace and the data trace signals would typically share connections between the trace generation logic 120 and the FIFO 130.

It has been found that when tracing data in addition to tracing instructions, the data trace signals over path 155 can use the majority of the trace port bandwidth from the trace generation block 120 to the FIFO 130. The trace signals are then drained through a narrow output trace port from the FIFO 130 to the trace buffer 12 via path 150. Typically, any trace signals issued over path 150 to the trace buffer are also accompanied by trace valid signals over path 140 indicating whether the output trace is valid or not. A trace valid signal would typically be set to invalid if the associated trace module has no trace data to issue in that clock cycle.

Since the output bandwidth from the FIFO 130 is typically less than the input bandwidth, there is the potential for the FIFO 130 to overflow, for example in the event of a sustained burst of trace data being issued by the trace generation block 120. As an example, the input trace port can be 4–5 times wider than the output trace port to the trace buffer.

Prior to the present invention, one way to seek to alleviate this problem was to cause a FIFO full signal to be issued from the on-chip trace module 10 back to the core 6 to cause the core 6 to stall temporarily so as to allow the level of data within the FIFO to reduce. However, due to the inherent latency and other issues, this approach has proved to be unreliable, since it was often found that between the time of issuance of the FIFO full signal and the stalling of the processor core, sufficient further trace signals were issued representing the activities of the core 6 prior to its stalling that the FIFO 130 had a tendency to overflow in any event.

In accordance with preferred embodiments of the present invention, this problem is alleviated by the provision of a suppression signal (referred to hereafter as the DSup signal) which can be issued by the FIFO 130 over path 160 directly to the trace generation block 120. In preferred embodiments, the FIFO 130 is arranged such that once the fullness of the FIFO reaches a predetermined suppression level, the FIFO 130 is arranged to issue the DSup signal to the trace generation block 120, this causing the trace generation block to cease issuing any data trace signals over path 155 whilst the DSup signal is asserted. Whilst this means that the data trace signals are lost, these are considered to be low priority trace signals which can be lost without losing synchronisation information. Furthermore, since the data trace typically uses much larger bandwidth than the high priority instruction trace, the suppression of the data trace has been found to often be sufficient to avoid the FIFO 130 becoming full.

When the quantity of trace data within the FIFO 130 subsequently falls to a predetermined restart level, then the FIFO 130 is arranged to de-assert the DSup signal, thereby causing the trace generation block 120 to again begin issuing data trace signals over path 155.

It will be appreciated that the predetermined suppression level and predetermined restart level can be chosen dependent on the implementation. However, by way of example, for a 60 byte FIFO, the predetermined suppression level may be set at 45 bytes (i.e. when the FIFO is 75% full), whereas typically the predetermined restart level will be set at some slightly lower value than 45 bytes to ensure that subsequent to the de-assertion of the suppression signal there is still some capacity to increase the amount of trace signals stored within the FIFO without needing to immediately re-assert the suppression signal.

Since the act of merely discarding the data trace signals upon issuance of the DSup signal cannot in all circumstances avoid the FIFO 130 overflowing, the FIFO 130 is able to issue an overflow signal over path 170 when it becomes full, to cause the trace generation block 120 to stop issuing any trace signals until the overflow signal is de-asserted. In such scenarios, it will be apparent that both high and low priority trace data will be lost, but by appropriate choice of the predetermined suppression level at which the DSup signal is issued, it is envisaged that it would only be on very rare occasions that the overflow signal would need to be issued.

In alternative embodiments, in addition to issuing the DSup signal to the trace generation block 120, the FIFO 130 may also take the additional internal step of only storing instruction trace signals after the DSup signal is asserted (thereby removing any latency between issuance of the DSup signal and the responding to that Dsup signal by the trace generation block).

Figure 3:
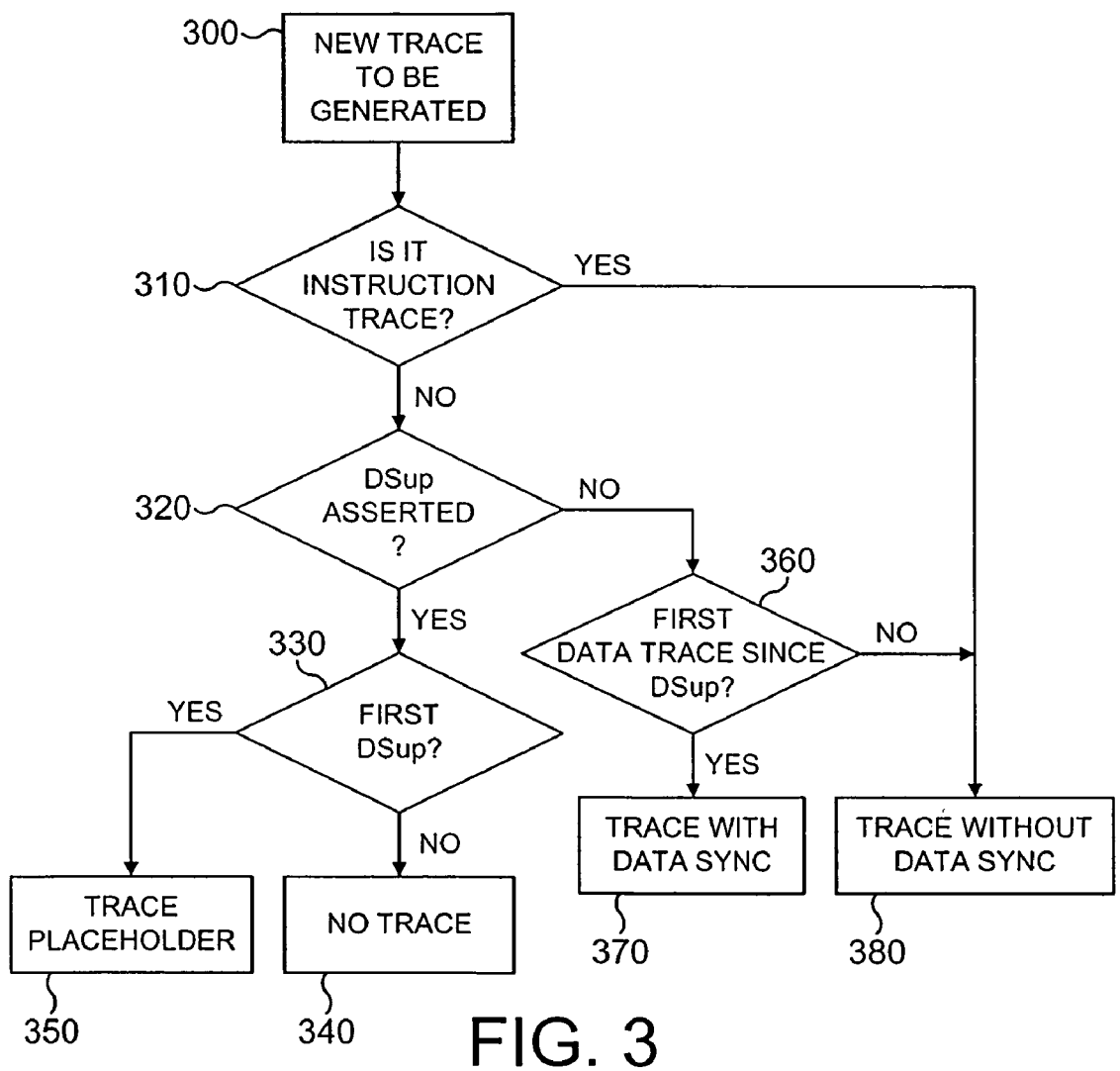
FIG. 3 is a flow diagram illustrating how the trace generation block of FIG. 2 determines what trace signals to issue in accordance with preferred embodiments of the present invention.

FIG. 3 is a flow diagram illustrating the steps taken by the trace generation block 120 of preferred embodiments in order to determine the trace signals to be output over paths 145, 155 to the FIFO 130. At step 300, it is determined whether there is any new trace data to be generated. When it is determined that there is new trace data to be generated, the process proceeds to step 310, where it is determined whether that trace data is instruction trace data. If it is, the process branches to step 380, where that trace data is issued over path 145 without any data synchronisation information. However, it will be appreciated by those skilled in the art that some other instruction synchronisation information may be required from time to time for the instruction trace.

If at step 310 it is determined that the trace data to be generated is not instruction data, then the trace data will be data trace, and the process proceeds to step 320 to determine whether the DSup signal has been asserted. If the DSup signal has been asserted, the process proceeds to step 330, where it is determined whether the item of data trace to be generated is the first item following issuance of the DSup signal. If it is not, then the process proceeds to step 340, whereby that item of data trace is not output. If, however, that item of data trace is the first item of data trace following issuance of the DSup signal, the process proceeds to step 350, where in place of the full data trace signal, a placeholder signal is output over path 155 to the FIFO. This placeholder signal will be a unique signal (e.g. a 1 byte signal identifying the beginning of data suppression) which can then be identified by any tool subsequently analysing the trace data, and used to indicate to that tool that data suppression has taken place. A placeholder could be issued for every item of data trace suppressed, but in preferred embodiments the placeholder is only issued for the first item of data trace to be suppressed, to reduce the risk that the issuance of the placeholders could itself cause the FIFO to overflow. Further, it is typically more important for the trace analysing tool to know that suppression has occurred, rather than to know how many data trace items have been suppressed.

If at step 320, it is determined that the DSup signal is not asserted, the process proceeds to step 360, where it is determined whether the data trace item to be traced is the first data trace item since the DSup signal was de-asserted. If it is, then that data trace signal is issued at step 370 along with any data synchronisation information required to enable that data trace signal to be subsequently analysed. For example, if compression of addresses in the output data trace is performed, the data synchronisation information may include the output of an uncompressed address.

However, assuming that at step 360 it is determined that the data trace item to be issued is not the first data trace item since the DSup signal was de-asserted, the process then branches to step 380, where that data trace item is output without any corresponding data synchronisation information.

Hence, in accordance with preferred embodiments of the present invention, it will be appreciated that the technique used enables overflowing of the FIFO to be dynamically prevented without stalling the core 6. Hence, instead of users spending large amounts of time attempting to filter the trace data to seek to prevent such overflowing, this approach ensures that as much trace data as possible is traced, with only low priority trace data being lost in the event that the FIFO reaches a level where it is likely to overflow.

Figure 4:
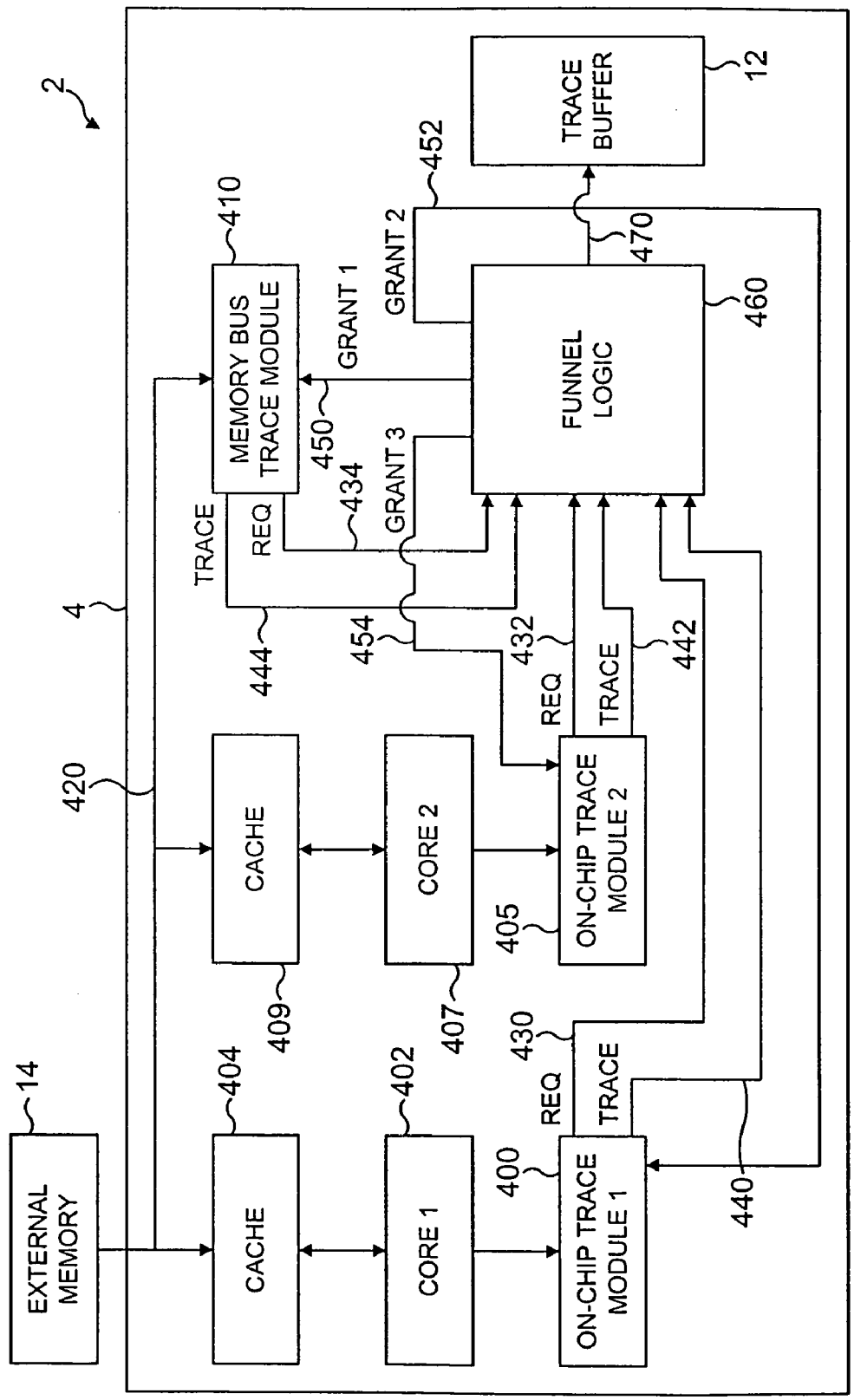
FIG. 4 is a diagram schematically illustrating a data processing system in accordance with one embodiment of the present invention, in which multiple on-chip trace modules are provided.

FIG. 4 is a block diagram of a data processing system providing multiple on-chip trace modules 400, 405, 410. In this example, the integrated circuit 4 has two processor cores 402, 407, which are coupled to corresponding caches 404, 409. Both caches 404, 409 are connected via a memory bus 420 with the external memory 14. Although not shown specifically in FIG. 4, the external memory 14 can be coupled to an external storage as illustrated in FIG. 1. In this example system, it is considered desirable to be able to trace the behaviour of both processor cores 402, 407 and the memory bus 420. Hence, separate on-chip trace modules 400, 405, 410, respectively are provided to trace these different components of the integrated circuit 4.

However, the cost of providing external pins, or separate trace buffers, for each such trace module will typically be too high. Accordingly, in the example illustrated in FIG. 4, a single trace buffer 12 is provided for storing the trace signals output by the various trace modules 400, 405, 410. Funnel logic 460 is then provided for arbitrating between the various on-chip trace modules so as to convert the various trace signals from those multiple on-chip trace modules into a single trace stream for outputting over path 470 to the trace buffer 12. Such arbitration is required since the sum of bandwidths on input trace paths 440, 442, 444 will typically be greater than the bandwidth available over path 470 to the trace buffer 12.

Each on-chip trace module 400, 405, 410 is in preferred embodiments arranged to issue a request signal over paths 430, 432, 434, respectively to the funnel logic 460 when that on-chip trace module wishes to output trace data. In practice, this request signal can be provided by the trace valid signal illustrated in FIG. 2. Based on predetermined criteria, the funnel logic 460 then arbitrates between the various request signals in order to determine which trace module should be allowed to issue trace data to the funnel logic for output to the trace buffer 12, and issues grant signals 452, 454, 450 accordingly. It will be appreciated that any suitable arbitration scheme may be used, for example a similar arbitration scheme could be used to that typically used on the memory bus to arbitrate between accesses requested by multiple processor cores, etc. When a particular trace module receives an asserted grant signal, it can then output its trace data over its respective trace path 440, 442, 444 between the trace module and the funnel logic 460. More details of the operation of the funnel logic 460 will now be described in more detail with reference to FIG. 5.

A request handler 500 is provided within the funnel logic 460 for receiving the various request signals over paths 430, 432, 434. The request handler 500 is then arranged to reference storage 510 containing predetermined prioritisation information in order to determine, in the event that more than one request signal is asserted at any particular point in time, which trace module should be issued a grant signal. The prioritisation information stored within the memory 510 may be predetermined or may be user programmable. In the example illustrated in FIG. 4, it will be assumed that the activities of the memory bus 420 are considered to be the most important to be traced, followed by the activities of core 1, followed by the activities of core 2. Accordingly, if the memory bus trace module 410 issues a request over path 434, it will be issued a grant signal over path 450 irrespective of the request signals present on paths 430, 432. Similarly, if request signals are received simultaneously over paths 430 and 432 from on-chip trace modules 400, 405, trace module 400 will be issued a grant signal over path 452 in preference to trace module 405.

A multiplexer 520 is provided within the funnel logic 460 for receiving the various trace signals received over paths 440, 442, 444 from the three trace modules. When the request handler 550 issues a grant signal, it at the same time issues an identifier signal over path 525 to the multiplexer 520, to cause the multiplexer 520 to output over path 535 the trace signals issued by the trace module being granted the grant signal. Accordingly, as an example, if the memory bus trace module 410 is issued a grant signal, then the multiplexer 520 will be arranged to output over path 535 signals received over input path 444.

Since a single trace stream is then output over path 470 to the trace buffer 12, it is important that an identification of which trace module is responsible for generating any particular portion of the trace stream is including within the trace stream, for use during subsequent analysis by trace tools resident on the computer 16 (see FIG. 1). Accordingly, in preferred embodiments, a wrapping protocol logic 530 is provided for receiving the trace output from the multiplexer 520, and for inserting into that trace identifiers indicating which component (or trace module) a particular portion of the trace stream relates to. In preferred embodiments, this identifier is derived by the wrapping protocol logic 530 from the identifier signal issued over path 525. The resulting trace stream is then output over path 470 to the trace buffer 12.

Figure 5:
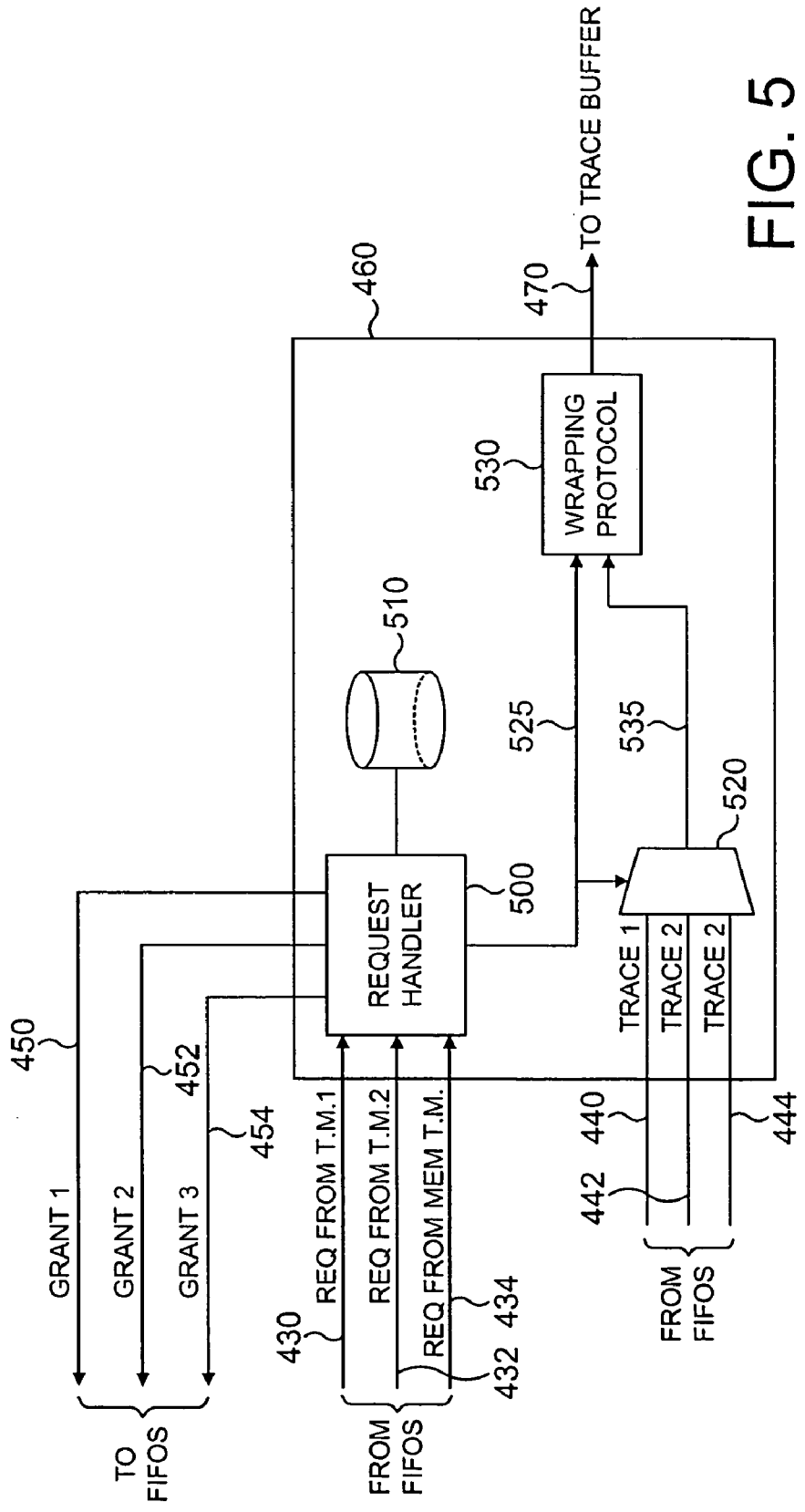
FIG. 5 is a block diagram illustrating in more detail the elements provided within the funnel logic of FIG. 4 in accordance with preferred embodiments of the present invention.

It will be appreciated by those skilled in the art that, whilst FIG. 5 schematically illustrates the operation of the funnel logic 460, certain practical implementations may require a number of registers in the control paths, and in such cases it may be necessary to provide some input buffering for the multiplexer 520.

Figure 7:
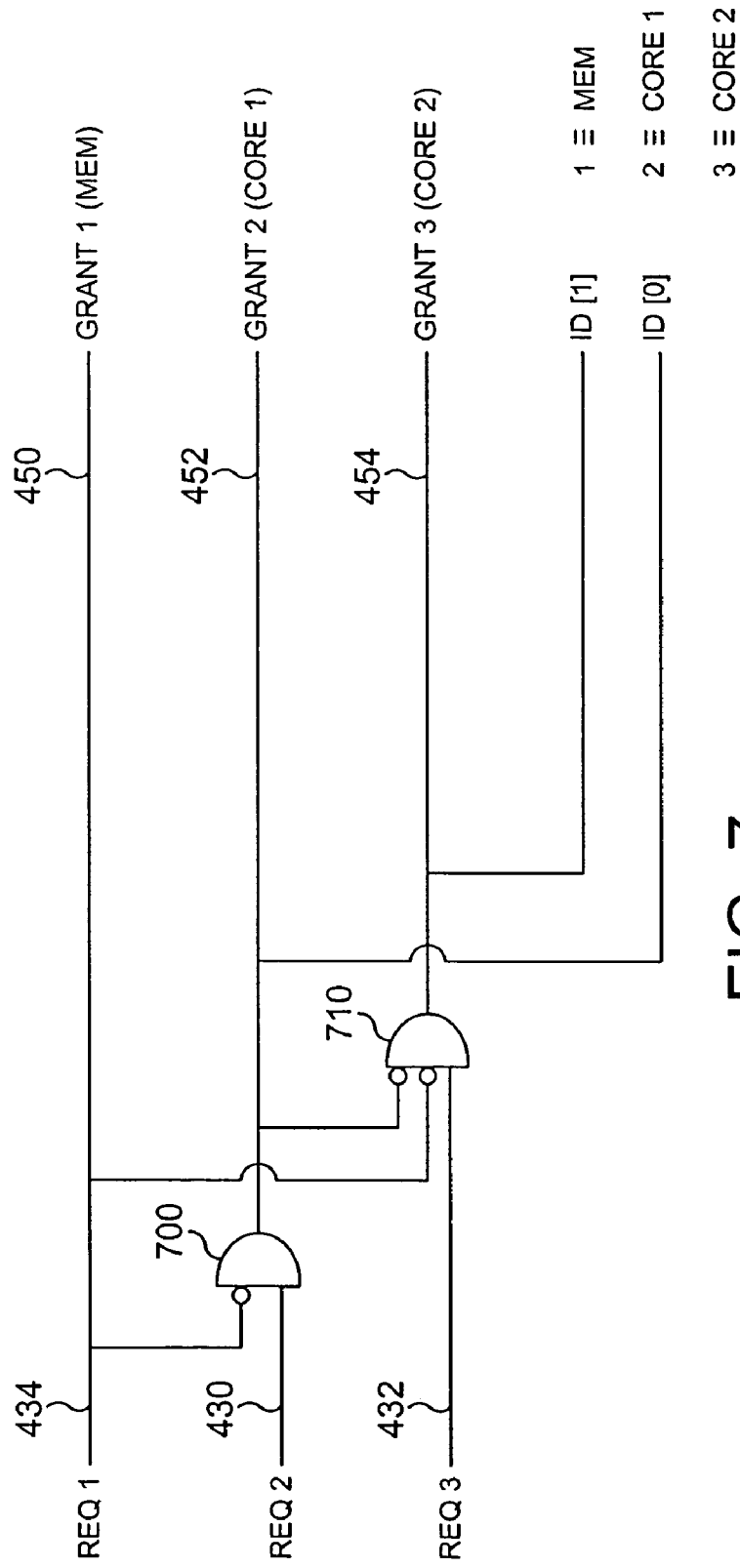
FIG. 7 is a diagram illustrating logic that may be used within the funnel logic of preferred embodiments in order to generate grant signals and identifier signals from the received request signals.

FIG. 7 is a diagram schematically illustrating the logic that may be provided within the request handler 500 in order to generate the appropriate grant signals and identifier signals. As mentioned above, in preferred embodiments, the activities of the memory bus are considered to be the most important to be traced, and accordingly a set request signal (i.e. at a logic 1 level) over path 434 from the memory bus trace module 410 is output as the grant signal on path 450. In such situations, the AND gates 700 and 710 ensure that the other two grant signals 452 and 454 are at a logic 0 level irrespective of the request signals received over paths 430 and 432. Further, it can be seen that the ID signal will also be "00", identifying the memory bus trace module 410 as the originator of the associated trace signal.

If the request signal on path 434 is not set (i.e. at a logic 0 level), then the AND gates 700,710 ensure that a set request signal from the on-chip trace module 1 400 takes preference over a set request signal from the on-chip trace module 2 405. Further, it can be seen from FIG. 7 that if the grant signal is asserted on path 452, the ID signal will be "01", identifying the on-chip trace module 1 400 as the originator of the associated trace signal. Similarly, if the grant signal is asserted on path 454, the ID signal will be "10", identifying the on-chip trace module 2 405 as the originator of the associated trace signal.

In one embodiment, each trace module is arranged to issue the request signal, and only upon receipt of the corresponding grant signal is it then able to output the trace signal to the funnel logic 460. However, in preferred embodiments, each trace module is arranged to issue the request signal and to cease outputting the trace signal if the grant signal is de-asserted. It is possible that in an integrated circuit such as that shown in FIG. 4, there may be one or more legacy trace module designs which are not designed to be responsive to grant signals. Such legacy design trace modules will be referred to hereafter as non-stallable devices, whereas trace modules which are designed to be responsive to grant signals will be referred to as stallable devices.

Figure 6:
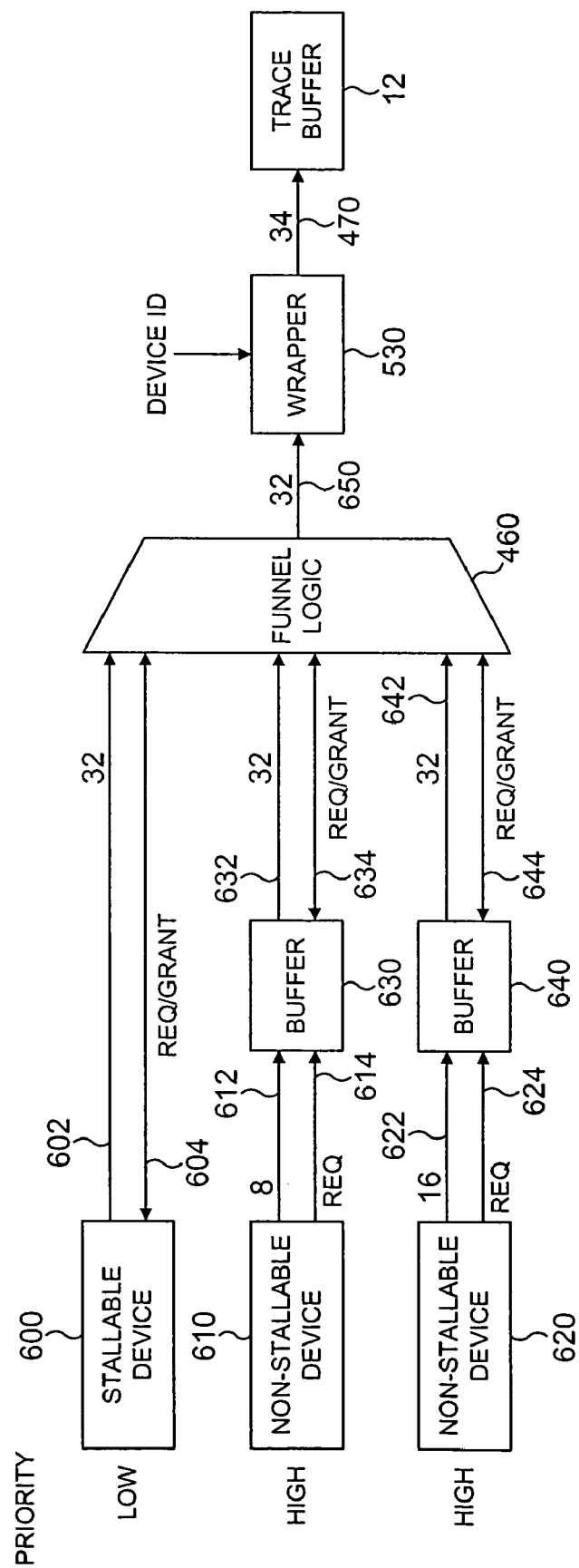
FIG. 6 is a diagram illustrating how the funnel logic of preferred embodiments may be arranged to interface with both stallable and non-stallable devices in accordance with preferred embodiments of the present invention.

In FIG. 6, one stallable device 600, and two non-stallable devices 610, 620 are schematically illustrated as being coupled to the funnel logic 460. Between each non-stallable device and the funnel logic 460 is placed a corresponding buffer 630, 640, also referred to herein as a stalling buffer.

As described earlier with reference to FIG. 5, if stallable device 600 wishes to issue trace data, it first issues a request signal over path 604, and when a corresponding grant signal is received back from the funnel logic 460 over path 604, it then issues the trace data over path 602. In this example, it will be assumed that the trace data has a bandwidth of 32 bits.

However, in contrast each non-stallable device 610, 620 will issue data trace items as and when generated, this being issued over paths 612, 622 to corresponding stalling buffers 630, 640. At the same time, trace valid signals will be issued over paths 614, 624, which can be considered analogous to request signals. For the sake of illustration, it is assumed in FIG. 6 that the non-stallable device 610 issues trace data with a bandwidth of 8 bits, whilst non-stallable device 620 issues trace data with a bandwidth of 16 bits.

Each stalling buffer 630, 640 is arranged to wait until it has 32-bits of trace data to issue, and is then arranged to issue a request signal to the funnel logic 460 over path 634, 644 respectively. When it receives a grant signal, it will then output the corresponding trace data over path 632, 642, respectively.

Since the stallable buffers 630, 640 will ideally be of relatively small size, it is preferable that the non-stallable devices 610, 620 are assigned a relatively high priority within the prioritisation information stored within the memory 510 of the funnel logic 460, so that the buffers 630, 640 will not need to wait long before receiving a grant signal. In the example illustrated in FIG. 6, assuming the non-stallable devices are given a higher priority than the stallable device 600, it is only necessary for each buffer 630, 640 to be 64 bits deep, since then it can be guaranteed that they will never overflow.

In order that only a single device need output trace in a single cycle, it is preferable that the total bandwidth of the non-stallable devices is not greater than the bandwidth of the funnel output stream. In the example illustrated in FIG. 6, the total bandwidth of the non-stallable devices is 24 bits, whereas the output bandwidth is 32 bits.

As described earlier with reference to FIG. 5, the issuance of appropriate grant signals by the funnel logic 460 ensures that a single stream of trace data is then output, in this example that trace stream having a bandwidth of 32 bits. As before, the trace stream is passed through wrapper logic 530, where a device identifier is added, after which the modified trace stream is output to the trace buffer 12. In the example illustrated in FIG. 6, there are three different devices, and accordingly two bits of information are required to uniquely identify the device within the device ID. Hence, the 32-bit trace stream will be modified to produce a 34-bit wide trace stream once the device ID has been added by the wrapper logic 530.

In FIG. 6, the wrapper logic 530 has been shown schematically as being external to funnel logic 460, so as to be able to clearly illustrate how the bandwidth of the trace stream changes as a result of incorporation of the device ID. It will be appreciated by those skilled in the art that the wrapping logic can be provided externally to the funnel logic, or within the funnel logic, as desired, without affecting the operation of the process.

From the above description of preferred embodiments of the present invention, it will be appreciated that improved techniques have been provided for generation of trace signals within a data processing apparatus. In particular, the use of a suppression signal within an on-chip trace module can be used to more reliably ensure that the FIFO of that on-chip trace module does not overflow, in the event that the suppression signal is asserted low priority trace data being suppressed to reduce the volume of trace data entering the FIFO. Further, in the event that multiple on-chip trace modules are used, the provision of a funnel logic as described above enables the various trace signals issued by those trace modules to be combined into a single trace stream for outputting to a trace buffer thereby allowing multiple trace modules to be used without an unacceptable increase in the cost of providing corresponding pins or trace buffers.

Although a particular embodiment of the invention has been described herewith, it will be apparent that the invention is not limited thereto, and that many modifications and additions may be made within the scope of the invention. For example, various combinations of the features of the following dependent claims could be made with the features of the independent claims without departing from the scope of the present invention.

We claim:

1. A data processing apparatus, comprising:
    a component whose behaviour is to be traced; and
    a trace generation unit for receiving input signals from the component indicative of the behaviour, and for generating from said input signals high priority and low priority trace signals for outputting to a trace receiving device;
    the trace generation unit being responsive to assertion of a suppression signal from the trace receiving device to suppress generation of the low priority trace signals.

2. A data processing apparatus as claimed in claim 1, wherein the trace receiving device is provided within the data processing apparatus.

3. A data processing apparatus as claimed in claim 1, wherein the trace receiving device is a buffer of a predetermined size for storing the trace signals output by the trace generation unit.

4. A data processing apparatus as claimed in claim 3, wherein the buffer is arranged to assert the suppression signal when the amount of trace signals stored within the buffer reaches a predetermined suppression level.

5. A data processing apparatus as claimed in claim 4, wherein the buffer is arranged to de-assert the suppression signal when the amount of trace signals stored within the buffer reduces to a predetermined restart level.

6. A data processing apparatus as claimed in claim 5, wherein the predetermined suppression level is higher than the predetermined restart level.

7. A data processing apparatus as claimed in claim 5, wherein for the first low priority trace signal following de-assertion of the suppression signal, the trace generation unit is arranged to output that first low priority trace signal with any required synchronisation data required to enable that first low priority trace signal to be subsequently analysed.

8. A data processing apparatus as claimed in claim 3, wherein the trace receiving device is an intermediate buffer having an input port coupled to the trace generation unit via a first bus having a first bandwidth, and having an output port coupled to a second bus having a second bandwidth so as to allow the trace signals to be output to a trace buffer, the first bandwidth being larger than the second bandwidth.

9. A data processing apparatus as claimed in claim 1, wherein a classification is maintained within the trace generation unit identifying whether any particular trace signal is a high priority trace signal or a low priority trace signal.

10. A data processing apparatus as claimed in claim 9, wherein the classification is programmable.

11. A data processing apparatus as claimed in claim 9, wherein the classification is predetermined.

12. A data processing apparatus as claimed in claim 11, wherein the classification defines that instruction trace signals are high priority trace signals and that data trace signals are low priority trace signals.

13. A data processing apparatus as claimed in claim 1, wherein the trace generation unit is arranged, whilst the suppression signal is asserted, to output to the trace receiving device a placeholder for low priority trace signals suppressed to indicate that suppression has occurred.

14. A data processing apparatus as claimed in claim 13, wherein the trace generation unit is arranged to only output a placeholder for the first low priority trace signal suppressed.

15. A data processing apparatus as claimed in claim 1, further comprising:
    a plurality of trace modules for receiving input signals from one or more components whose behaviours are to be traced, each trace module being arranged to generate from its respective input signals trace signals for outputting over a corresponding trace bus, at least one of said trace modules comprising said trace generation unit and its corresponding trace receiving device, and the corresponding trace bus being coupled to an output of the trace receiving device; and
    funnel logic coupled to the trace buses of the trace modules so as to receive as input trace signals the trace signals output on each trace bus, and being arranged to generate at an output port a trace stream derived from the input trace signals, the output port having a maximum bandwidth which is less than the collective maximum bandwidth of the trace buses coupled to the funnel logic;
    the funnel logic being arranged to control the issuance of trace signals by the trace modules to ensure that the input trace signals can be output from the output port without exceeding the maximum bandwidth of the output port.

16. A data processing apparatus as claimed in claim 15, wherein, at any point in time, the funnel logic is arranged to indicate to the trace modules which trace module should provide trace signals to the funnel logic, such that the trace stream only contains the trace signals from one trace module at any point in time.

17. A data processing apparatus as claimed in claim 15, wherein the funnel logic comprises a request handler for receiving request signals from each trace module wishing to output trace signals onto its corresponding trace bus, and for applying predetermined criteria to determine from the received request signals which trace module should provide trace signals to the funnel logic.

18. A data processing apparatus as claimed in claim 17, wherein the request handler is arranged, upon application of the predetermined criteria, to issue a grant signal to the trace module that is to provide trace signals to the funnel logic.

19. A data processing apparatus as claimed in claim 18, wherein the issuance of trace signals by at least one of the trace modules is not controllable by the funnel logic, the data processing apparatus further comprising a stalling buffer for each such trace module coupled between that trace module and the funnel logic to buffer trace signals output by that trace module, and wherein the stalling buffer is arranged to issue a request signal on behalf of the associated trace module and to respond to any grant signal issued by the request handler to cause the buffered trace signals to be output to the funnel logic.

20. A data processing apparatus as claimed in claim 19, wherein the stalling buffer is arranged to issue the request signal when the amount of trace signals stored within the stalling buffer reaches a predetermined level.

21. A data processing apparatus as claimed in claim 17, wherein the predetermined criteria defines a prioritization between the various trace modules.

22. A data processing apparatus as claimed in claim 17, wherein the predetermined criteria is programmable.

23. A data processing apparatus as claimed in claim 17, wherein the funnel logic further comprises a multiplexer whose inputs are coupled to respective ones of said trace buses, the request handler being arranged, upon application of the predetermined criteria, to issue a control signal to the multiplexer to control which input of the multiplexer is to be output from the multiplexer as the trace stream for routing to the output port of the funnel logic.

24. A data processing apparatus as claimed in claim 23, wherein the funnel logic further comprises wrapping logic for introducing into the trace stream an identifier indicating which component a particular portion of the trace stream relates to.

25. A data processing apparatus as claimed in claim 24, wherein the wrapping logic is arranged to receive the control signal issued to the multiplexer, the identifier being derived from the control signal.

26. A data processing apparatus as claimed in claim 15, wherein one trace module is provided for each component to be traced.

27. A data processing apparatus as claimed in claim 15, wherein the funnel logic is able to control issuance of trace signals by each trace module.

28. A data processing apparatus as claimed in claim 15, wherein the issuance of trace signals by at least one of the trace modules is not controllable by the funnel logic, the data processing apparatus further comprising a stalling buffer for each such trace module coupled between that trace module and the funnel logic to buffer trace signals output by that trace module.

29. A data processing apparatus as claimed in claim 15, wherein the output port is coupled to a trace buffer of the data processing apparatus.

30. A data processing apparatus as claimed in claim 15, wherein the output port comprises a plurality of pins for enabling the trace stream to be output from the data processing apparatus.

31. A data processing apparatus comprising:
a plurality of trace modules for receiving input signals from one or more components whose behaviours are to be traced, each trace module being arranged to generate from its respective input signals trace signals for outputting over a corresponding trace bus; and
funnel logic coupled to the trace buses of the trace modules so as to receive as input trace signals the trace signals output on each trace bus, and being arranged to generate at an output port a trace stream derived from the input trace signals, the output port having a maximum bandwidth which is less than the collective maximum bandwidth of the trace buses coupled to the funnel logic;
the funnel logic being arranged to control the issuance of trace signals by the trace modules to ensure that the input trace signals can be output from the output port without exceeding the maximum bandwidth of the output port, wherein the funnel logic comprises a request handler for receiving request signals from each trace module wishing to output trace signals onto its corresponding trace bus, and for applying predetermined criteria to determine from the received request signals which trace module should provide trace signals to the funnel logic.

32. A data processing apparatus as claimed in claim 31, wherein, at any point in time, the funnel logic is arranged to indicate to the trace modules which trace module should provide trace signals to the funnel logic, such that the trace stream only contains the trace signals from one trace module at any point in time.

33. A data processing apparatus as claimed in claim 31, wherein the request handler is arranged, upon application of the predetermined criteria, to issue a grant signal to the trace module that is to provide trace signals to the funnel logic.

34. A data processing apparatus as claimed in claim 33, wherein the issuance of trace signals by at least one of the trace modules is not controllable by the funnel logic, the data processing apparatus further comprising a stalling buffer for each such trace module coupled between that trace module and the funnel logic to buffer trace signals output by that trace module, and wherein the stalling buffer is arranged to issue a request signal on behalf of the associated trace module and to respond to any grant signal issued by the request handler to cause the buffered trace signals to be output to the funnel logic.

35. A data processing apparatus as claimed in claim 34, wherein the stalling buffer is arranged to issue the request signal when the amount of trace signals stored within the stalling buffer reaches a predetermined level.

36. A data processing apparatus as claimed in claim 31, wherein the predetermined criteria defines a prioritization between the various trace modules.

37. A data processing apparatus as claimed in claim 31, wherein the predetermined criteria is programmable.

38. A data processing apparatus as claimed in claim 31, wherein the funnel logic further comprises a multiplexer whose inputs are coupled to respective ones of said trace buses, the request handler being arranged, upon application of the predetermined criteria, to issue a control signal to the multiplexer to control which input of the multiplexer is to be output from the multiplexer as the trace stream for routing to the output port of the funnel logic.

39. A data processing apparatus as claimed in claim 38, wherein the funnel logic further comprises wrapping logic for introducing into the trace stream an identifier indicating which component a particular portion of the trace stream relates to.

40. A data processing apparatus as claimed in claim 39, wherein the wrapping logic is arranged to receive the control signal issued to the multiplexer, the identifier being derived from the control signal.

41. A data processing apparatus as claimed in claim 31, wherein one trace module is provided for each component to be traced.

42. A data processing apparatus as claimed in claim 31, wherein the funnel logic is able to control issuance of trace signals by each trace module.

43. A data processing apparatus as claimed in claim 31, wherein the output port is coupled to a trace buffer of the data processing apparatus.

44. A data processing apparatus as claimed in claim 31, wherein the output port comprises a plurality of pins for enabling the trace stream to be output from the data processing apparatus.

45. A data processing apparatus, comprising:
a plurality of trace modules for receiving input signals from one or more components whose behaviours are to be traced, each trace module being arranged to generate from its respective input signals trace signals for outputting over a corresponding trace bus; and funnel logic coupled to the trace buses of the trace modules so as to receive as input trace signals the trace signals output on each trace bus, and being arranged to generate at an output port a trace stream derived from the input trace signals, the output port having a maximum bandwidth which is less than the collective maximum bandwidth of the trace buses coupled to the funnel logic;

the funnel logic being arranged to control the issuance of trace signals by the trace modules to ensure that the input trace signals can be output from the output port without exceeding the maximum bandwidth of the output port, wherein the issuance of trace signals by at least one of the trace modules is not controllable by the funnel logic, the data processing apparatus further comprising a stalling buffer for each such trace module coupled between that trace module and the funnel logic to buffer trace signals output by that trace module.

46. A method of generating trace signals within a data processing apparatus having a component whose behaviour is to be traced, the method comprising using a trace generation unit to perform the steps of:
(i) receiving input signals from the component indicative of the behaviour;
(ii) generating from said input signals high priority and low priority trace signals for outputting to a trace receiving device; and
(iii) during said step (ii), being responsive to assertion of a suppression signal from the trace receiving device to suppress generation of the low priority trace signals.

47. A method as claimed in claim 46, wherein the trace receiving device is provided within the data processing apparatus.

48. A method as claimed in claim 46, wherein the trace receiving device is a buffer of a predetermined size for storing the trace signals generated at said step (ii).

49. A method as claimed in claim 48, further comprising the step of:
causing the buffer to assert the suppression signal when the amount of trace signals stored within the buffer reaches a predetermined suppression level.

50. A method as claimed in claim 49, further comprising the step of causing the buffer to de-assert the suppression signal when the amount of trace signals stored within the buffer reduces to a predetermined restart level.

51. A method as claimed in claim 50, wherein the predetermined suppression level is higher than the predetermined restart level.

52. A method as claimed in claim 50, wherein for the first low priority trace signal following de-assertion of the suppression signal, the trace generation unit is arranged to output that first low priority trace signal with any required synchronisation data required to enable that first low priority trace signal to be subsequently analysed.

53. A method as claimed in claim 48, wherein the trace receiving device is an intermediate buffer having an input port coupled to the trace generation unit via a first bus having a first bandwidth, and having an output port coupled to a second bus having a second bandwidth so as to allow the trace signals to be output to a trace buffer, the first bandwidth being larger than the second bandwidth.

54. A method as claimed in claim 46, further comprising the step of maintaining a classification within the trace generation unit identifying whether any particular trace signal is a high priority trace signal or a low priority trace signal.

55. A method as claimed in claim 54, wherein the classification is programmable.

56. A method as claimed in claim 54, wherein the classification is predetermined.

57. A method as claimed in claim 56, wherein the classification defines that instruction trace signals are high priority trace signals and that data trace signals are low priority trace signals.

58. A method as claimed in claim 46, wherein during said step (ii) the trace generation unit is arranged, whilst the suppression signal is asserted, to output to the trace receiving device a placeholder for low priority trace signals suppressed to indicate that suppression has occurred.

59. A method as claimed in claim 58, wherein during said step (ii) the trace generation unit is arranged to only output a placeholder for the first low priority trace signal suppressed.

60. A method as claimed in claim 46, wherein the data processing apparatus comprises a plurality of trace modules for receiving input signals from one or more components whose behaviours are to be traced, each trace module being arranged to generate from its respective input signals trace signals for outputting over a corresponding trace bus, at least one of said trace modules comprising said trace generation unit and its corresponding trace receiving device, and the corresponding trace bus being coupled to an output of the trace receiving device, the method further comprising the steps of:
(a) receiving at funnel logic as input trace signals the trace signals output on each trace bus;
(b) generating at an output port of the funnel logic a trace stream derived from the input trace signals, the output port having a maximum bandwidth which is less than the collective maximum bandwidth of the trace buses coupled to the funnel logic; and
(c) controlling the issuance of trace signals by the trace modules to ensure that the input trace signals can be output from the output port without exceeding the maximum bandwidth of the output port.

61. A method as claimed in claim 60, wherein, at any point in time, the funnel logic is arranged to indicate to the trace modules which trace module should provide trace signals to the funnel logic, such that the trace stream only contains the trace signals from one trace module at any point in time.

62. A method as claimed in claim 60, wherein said step (c) comprises the steps of:
receiving request signals from each trace module wishing to output trace signals onto its corresponding trace bus; and
applying predetermined criteria to determine from the received request signals which trace module should provide trace signals to the funnel logic.

63. A method as claimed in claim 62, further comprising, upon application of the predetermined criteria, the step of issuing a grant signal to the trace module that is to provide trace signals to the funnel logic.

64. A method as claimed in claim 63, wherein the issuance of trace signals by at least one of the trace modules is not controllable by the funnel logic, the data processing apparatus further comprising a stalling buffer for each such trace module coupled between that trace module and the funnel logic to buffer trace signals output by that trace module, and wherein the stalling buffer is arranged to issue a request signal on behalf of the associated trace module and to respond to any grant signal issued by the request handler to cause the buffered trace signals to be output to the funnel logic.

65. A method as claimed in claim 64, wherein the stalling buffer is arranged to issue the request signal when the amount of trace signals stored within the stalling buffer reaches a predetermined level.

66. A method as claimed in claim 62, wherein the predetermined criteria defines a prioritization between the various trace modules.

67. A method as claimed in claim 62, wherein the predetermined criteria is programmable.

68. A method as claimed in claim 62, wherein the funnel logic comprises a multiplexer whose inputs are coupled to respective ones of said trace buses, the method further comprising, upon application of the predetermined criteria, the step of issuing a control signal to the multiplexer to control which input of the multiplexer is to be output from the multiplexer as the trace stream for routing to the output port of the funnel logic.

69. A method as claimed in claim 68, further comprising the step of introducing into the trace stream an identifier indicating which component a particular portion of the trace stream relates to.

70. A method as claimed in claim 69, wherein the identifier is derived from the control signal issued to the multiplexer.

71. A method as claimed in claim 60, wherein one trace module is provided for each component to be traced.

72. A method as claimed in claim 60, wherein the funnel logic is able to control issuance of trace signals by each trace module.

73. A method as claimed in claim 60, wherein the issuance of trace signals by at least one of the trace modules is not controllable by the funnel logic, the data processing apparatus further comprising a stalling buffer for each such trace module coupled between that trace module and the funnel logic to buffer trace signals output by that trace module.

74. A method as claimed in claim 60, wherein the output port is coupled to a trace buffer of the data processing apparatus.

75. A method as claimed in claim 60, wherein the output port comprises a plurality of pins for enabling the trace stream to be output from the data processing apparatus.

76. A computer readable medium including computer readable instructions that when executed are operable to perform the method of claim 46.

77. A method of generating trace signals within a data processing apparatus having a plurality of trace modules for receiving input signals from one or more components whose behaviours are to be traced, each trace module being arranged to generate from its respective input signals trace signals for outputting over a corresponding trace bus, the method comprising the steps of:
 (a) receiving at funnel logic as input trace signals the trace signals output on each trace bus;
 (b) generating at an output port of the funnel logic a trace stream derived from the input trace signals, the output port having a maximum bandwidth which is less than the collective maximum bandwidth of the trace buses coupled to the funnel logic; and
 (c) controlling the issuance of trace signals by the trace modules to ensure that the input trace signals can be output from the output port without exceeding the maximum bandwidth of the output port, wherein said step (c) comprises the steps of:
 receiving request signals from each trace module wishing to output trace signals onto its corresponding trace bus; and
 applying predetermined criteria to determine from the received request signals which trace module should provide trace signals to the funnel logic.

78. A method as claimed in claim 77, wherein, at any point in time, the funnel logic is arranged to indicate to the trace modules which trace module should provide trace signals to the funnel logic, such that the trace stream only contains the trace signals from one trace module at any point in time.

79. A method as claimed in claim 77, further comprising, upon application of the predetermined criteria, the step of issuing a grant signal to the trace module that is to provide trace signals to the funnel logic.

80. A method as claimed in claim 79, wherein the issuance of trace signals by at least one of the trace modules is not controllable by the funnel logic, the data processing apparatus further comprising a stalling buffer for each such trace module coupled between that trace module and the funnel logic to buffer trace signals output by that trace module, and wherein the stalling buffer is arranged to issue a request signal on behalf of the associated trace module and to respond to any grant signal issued by the request handler to cause the buffered trace signals to be output to the funnel logic.

81. A method as claimed in claim 80, wherein the stalling buffer is arranged to issue the request signal when the amount of trace signals stored within the stalling buffer reaches a predetermined level.

82. A method as claimed in claim 77, wherein the predetermined criteria defines a prioritization between the various trace modules.

83. A method as claimed in claim 77, wherein the predetermined criteria is programmable.

84. A method as claimed in claim 77, wherein the funnel logic comprises a multiplexer whose inputs are coupled to respective ones of said trace buses, the method further comprising, upon application of the predetermined criteria, the step of issuing a control signal to the multiplexer to control which input of the multiplexer is to be output from the multiplexer as the trace stream for routing to the output port of the funnel logic.

85. A method as claimed in claim 84, further comprising the step of introducing into the trace stream an identifier indicating which component a particular portion of the trace stream relates to.

86. A method as claimed in claim 85, wherein the identifier is derived from the control signal issued to the multiplexer.

87. A method as claimed in claim 77, wherein one trace module is provided for each component to be traced.

88. A method as claimed in claim 77 wherein the funnel logic is able to control issuance of trace signals by each trace module.

89. A method as claimed in claim 77, wherein the output port is coupled to a trace buffer of the data processing apparatus.

90. A method as claimed in claim 77, wherein the output port comprises a plurality of pins for enabling the trace stream to be output from the data processing apparatus.

91. A method of generating trace signals within a data processing apparatus having a plurality of trace modules for receiving input signals from one or more components whose behaviours are to be traced, each trace module being arranged to generate from its respective input signals trace signals for outputting over a corresponding trace bus, the method comprising the steps of:
 (a) receiving at funnel logic as input trace signals the trace signals output on each trace bus;

(b) generating at an output port of the funnel logic a trace stream derived from the input trace signals, the output port having a maximum bandwidth which is less than the collective maximum bandwidth of the trace buses coupled to the funnel logic; and
(c) controlling the issuance of trace signals by the trace modules to ensure that the input trace signals can be output from the output port without exceeding the maximum bandwidth of the output port, wherein the issuance of trace signals by at least one of the trace modules is not controllable by the funnel logic, the data processing apparatus further comprising a stalling buffer for each such trace module coupled between that trace module and the funnel logic to buffer trace signals output by that trace module.

\* \* \* \* \*